May 25, 1926.  1,586,249
O. KROGH ET AL
MANUFACTURING OF TUBES
Filed August 29, 1925
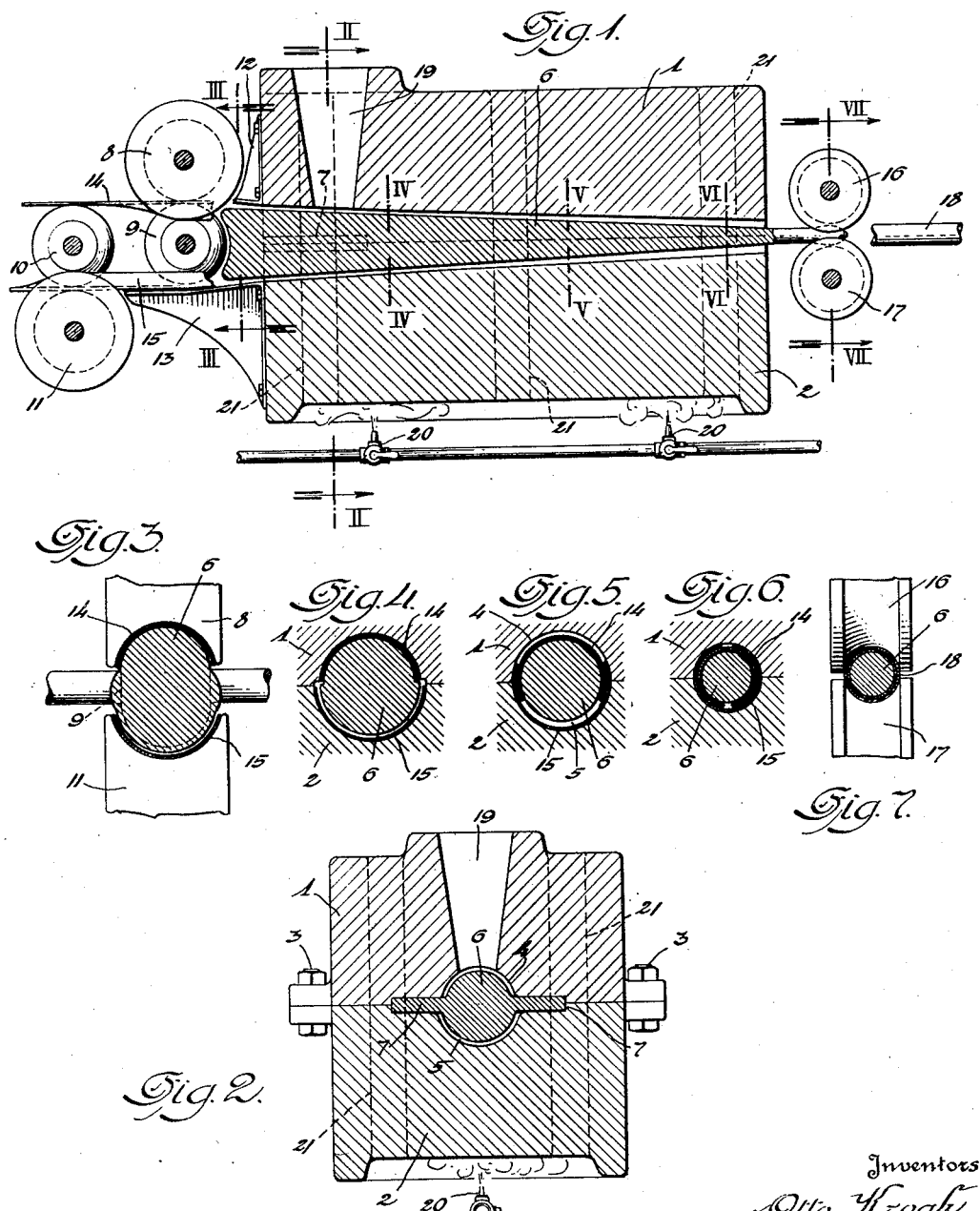

Patented May 25, 1926.

1,586,249

UNITED STATES PATENT OFFICE.

OTTO KROGH AND CHRISTIAN HENRIKSEN, OF DETROIT, MICHIGAN.

MANUFACTURING OF TUBES.

Application filed August 29, 1925. Serial No. 53,962.

This invention relates to improvements in the manufacturing of light tubes using a plurality of metal bands or strips formed around one another and extending lengthwise of the tube, having for its object to provide a method of so producing such tubes that great uniformity of construction and strength and durability of the tubes when constructed will result, this application being a continuation of an original application for Letters Patent filed by us on the 18th day of February, 1924, Serial No. 693,635, with respect to all subject matter which is common to both the present and the said original applications. It is also an object to secure freedom from leaky seams or libility of the layers or laminations of the tubes to become separated, when in use or when subjected to pressures or vibrations such as ordinarily bring about the fracture or result in the springing of seams in sheet metal tubes as ordinarily constructed.

Tubes produced according to this invention may have walls of very light gauge material so that they may be quite cheaply constructed and at the same time will be very efficient as regards strength and durability relative to the thickness of the walls thereof so that they are eminently adapted for use in connection with mechanical devices where they are subjected to vibration and it is desirable that they be at the same time of light construction.

It is also an important object of this invention to provide for the construction of a laminated sheet metal tube in such manner that solder or its equivalent is caused to form a banding together of the laminations of the tube throughout the whole or practically the whole of their contacting surfaces, whereby, to all intents and purposes, a solid metallic wall is provided in the completed tube.

A still further object is to provide for the flowing of the solder or its equivalent over the outer surface of the innermost lamination as the succeeding outer lamination is lapped thereover so that the said solder will be thereby spread between the laminations as they are manipulated into the form of the completed tube.

Further objects subsidiary to or resulting from the aforesaid objects or from the construction or operation of the invention as it may be carried into effect, will become apparent as the said invention is hereinafter further disclosed.

In carrying the said invention into effect we propose to roll metal bands into tubular formation in direction of their length, one within the other so that a laminated tube is produced with the seams of the respective laminations alternately disposed on opposite sides of the tube and to introduce between the laminations, in the course of the formation of the tube, solder or its equivalent whereby the said laminations are soldered together throughout practically their entire contacting surfaces and a solid walled tube is produced. This we may effect by providing a tapered mandrel having upper and lower arcuate faces converging into a cylindrical portion, and a die surrounding and conforming to the shape of said mandrel with upper and lower sets of rolls adapted to initially roll upper and lower strips of metal to curved formations in cross section conforming to the arcuate faces of the mandrel, said rolls feeding such formed strips to the mandrel and die and effecting their passage over the mandrel and through the die. One of the arcuate faces of the mandrel throughout a portion of its length is of smaller radius than the other so that as the strips progress thereover, that having the larger radius will overlap that having the smaller radius whereby their continued progress eventually results in the production of a laminated tube, and prior to or during the overlapping of the strips we introduce into the mold solder or its equivalent and heat the mold so that this solder is spread between the laminations of the tube as it is found.

All of which is more particularly described and ascertained hereinafter, by way of example, having reference to the accompanying drawing, wherein Figure 1 is a diagrammatic sectional elevation of an arrangement of rolls, die and matrix for the production of tubes according to this invention;

Figure 2 is a transverse section of the same taken on the line II—II, Figure 1;

Figure 3 is a fragmentary detail sectional view taken on the line III—III, Figure 1, the guides being omitted;

Figure 4 is a transverse sectional detail view of the die, matrix and partly formed tube, taken on the line IV—IV, Figure 1;

Figures 5 and 6 are similar sectional views taken on the lines V—V and VI—VI, Figure 1, and Figure 7 is a fragmentary transverse sectional view, with the receiving rollers in elevation, taken on the line VII—VII, Figure 1.

Figures 3 to 7 are drawn to a larger scale than are Figures 1 and 2, and similar characters of reference indicate similar parts in the several figures of the drawing.

1 is the upper member and 2 the lower member of a die secured together by bolts 3, and each having opposed tapering channels 4 and 5 forming a bore in the die in which is located a mandrel 6 extending longitudinally therethrough and having sufficient clearance between its surface and the walls of the said bore to permit the passing therebetween of metal strips as hereinafter described. The said mandrel is held and positioned by the clamping of lateral extensions 7 of the said mandrel between the upper and lower parts of the die, which parts are suitably recessed for the accommodation of the said extensions.

The said mandrel and the bore of the die are so shaped that one part of the arcuate passage therebetween is of greater radius than the other, in the illustrated example the lower part of the passage being of greater radius than the upper part thereof, but as the bore of the die narrows down towards the smaller or outlet end thereof this variation is decreased until a truly circular passage results which will be understood by an examination of the differences in the sections IV—IV and V—V illustrated in Figures 4 and 5.

Opposed to the entrance of the upper part of the arcuate passage between the mandrel and the upper die are a pair of combination forming and feed rollers 8 and 9 adapted to be driven in any suitable or well known manner (not shown) and likewise opposed to the entrance of the lower part of the said passage are somewhat similar rollers 10 and 11.

12 and 13 are guides facilitating the entrance of metallic strips 14 and 15 into the bore of the die. At the opposite end of the die, and located above and below the smaller end of the mandrel which projects therefrom, are rollers 16 and 17 which assist in the delivery and finishing operation of the formed tube 18. The upper part of the die is provided with an opening 19 for the reception of molten solder, tin, lead or other equivalent substance suitable for the cementing together of the laminations of the tube.

The operation of producing a tube is as follows;

An upper strip or ribbon 14 of metal is fed between the rollers 8 and 9 which have concave and convex surfaces respectively to give an upwardly curved arcuate cross section to the strip conforming to that of the entrance between the mandrel and the upper part of the die, into which entrance the strip is then fed by the said rollers 8 and 9; and at the same time a further strip of metal 15 is bent in the opposite direction and fed between the rollers 10 and 11 into the passage between the said mandrel and the lower part of the die.

As the two strips are pushed into the bore of the die they approach one another so that when reaching the point indicated by the section line IV—IV, the opposed edges of the upper and lower strips are adjacent to each other, with the edges of the lower strip located outwardly of the edges of the upper strip due to the greater radius of the lower part of the mandrel and of the bore of the die at this point; and the further progress of the strips through the die results in the margins of the lower strip passing over the margins of the upper strip due to the decreased diameter of the bore, this condition occurring at points beyond that indicated by the said section line IV—IV as is clearly shown by the section taken on the line V—V.

The further progress of the strips is accomplished by the progressive restriction of the diameter of the partially formed tube by the tapered bore, so that, at the point indicated by the section line VI—VI, the metal strips assume approximately the form indicated in Figure 6, and by the time the strips reach the delivery end of the die they have been formed into a laminated tube, with the edges of the strips close or approximately close together in complete circular formation of the strips; following which the so formed tube is received between the rollers 16 and 17 which complete the shaping of the tube if this be thought necessary, or desirable.

An important feature of this method of manufacturing a sheet metal tube is the efficient soldering of the laminations of the tube together, and this is effected by heating the die, such as means of burners 20, the die being indicated as provided with vertical openings 21 wherein to permit the passage of flame from the burners therethrough for the better heating of the die. Solder, tin or other suitable binding material is introduced into the opening 19 in the upper part of the die and flows over the outer surface of the upper metallic strip passing through the bore of the die, whereby, as this strip in its progress through the die is overlapped by the lower strip, it is effectively coated with molten solder and carries this solder with it in the laminating operation, as a result of which a layer of the said solder extends between practically the complete meeting faces of the two strips when the tube is fully formed. Consequently the said strips are soldered together throughout the complete circle of the tube and the seams are also fully soldered, the said solder being kept in a molten condition by the die throughout the process of forming the tube.

It will be obvious that great uniformity may be secured in the production of lengths of tubing in this manner, and that they will be of solid walled construction when complete, to all intents and purposes, being absolutely leak proof and not subject to fracture or damage upon being bent in the same manner as is the case with tubes not so completely soldered.

It will also be apparent that strips may be used which have already been coated with solder or similar fusible material prior to introduction to the die, in which case the heated die results in the fusing of the solder so that the same action already described takes place within the die.

The fact that the laminations slide over one another in the course of being formed into the tube and that the solder is maintained in a fused condition during this operation, as well as the fact that the metallic strips are heated by the die during the said operation, insures an effective spreading and eventual adhering of the solder to and between the strips of the laminated tube; and the said solder being maintained in this fused condition during the sliding of one strip over the other, acts to some extent as a lubricant and assists in the laminating operation.

This invention may be developed within the scope of the following claims without departing from the essential features of the said invention, and it is desired that the specification and drawing be read as merely illustrative and not in a limiting sense, except as necessitated by the prior art.

What we claim is:—

1. The method of manufacturing sheet metal tubing which consists in feeding ribbons of metal through a tapered die wherein the said ribbons of metal are bent longitudinally of their length one within the other into tubular formation whereby a single tube composed of a plurality of ribbons arranged in laminated formation with the seams thereof on opposite sides of the tube and running lengthwise thereof is produced, and spreading solder in a fused condition between the said laminations as they are formed.

2. The method according to claim 1, wherein the die is heated and the solder is admitted to the bore of the die near its ribbon receiving end.

3. The method of manufacturing sheet metal tubing which consists in feeding transversely curved ribbons of metal through a die having a tapered bore and on opposite sides of a tapered mandrel in said bore wherein one of said ribbons is maintained in transversely curved formation of greater radius than the other and is guided into progressively overlapping relation around such other ribbon, introducing molten solder between said laminations during the overlapping process and continuing the overlapping until a complete laminated tube is produced.

4. The method of manufacturing sheet metal tubes wherein an upper metallic ribbon is fed between upper concave lower convex rollers to the tapered bore of a die, and a lower ribbon is fed between upper convex and lower concave rollers to said bore, said bore being tapered whereby said ribbons are closed together on one another therein as they pass therethrough and caused to overlap progressively as the diameter of the bore diminishes in order to form said ribbons into a complete laminated tube and introducing solder between said laminations as they are formed whereby said solder is spread between and cements said laminations into a solid wall.

In testimony whereof we affix our signatures.

OTTO KROGH.
CHRISTIAN HENRIKSEN.